United States Patent
Voss

(10) Patent No.: US 7,168,314 B2
(45) Date of Patent: Jan. 30, 2007

(54) ULTRASONIC FILLING LEVEL SENSOR

(75) Inventor: Wolfgang Voss, Iserlohn (DE)

(73) Assignee: Werner Turck GmbH & Co. KG, Halver (DE)

( * ) Notice: Subject to any disclaimer, the term of this patent is extended or adjusted under 35 U.S.C. 154(b) by 177 days.

(21) Appl. No.: 10/976,008

(22) Filed: Oct. 28, 2004

(65) Prior Publication Data
US 2005/0150291 A1 Jul. 14, 2005

(30) Foreign Application Priority Data
Dec. 20, 2003 (DE) ............... 103 60 107

(51) Int. Cl.
*G01F 23/296* (2006.01)
(52) U.S. Cl. .................. 73/290 V
(58) Field of Classification Search ........... None
See application file for complete search history.

(56) References Cited

U.S. PATENT DOCUMENTS

| | | | | |
|---|---|---|---|---|
| 5,309,763 A | * | 5/1994 | Sinclair | 73/290 V |
| 5,979,233 A | * | 11/1999 | Johnson | 73/149 |
| 6,018,882 A | * | 2/2000 | Brousseau | 33/725 |
| 2004/0007061 A1 | * | 1/2004 | Forgue | 73/290 V |

FOREIGN PATENT DOCUMENTS

| | | |
|---|---|---|
| DE | 33 30 059 | 2/1985 |
| DE | 33 30 063 | 2/1985 |
| DE | 40 25 326 | 11/1991 |
| DE | 43 07 635 | 9/1993 |
| DE | 43 28 046 | 3/1994 |
| DE | 44 19 462 | 12/1995 |

* cited by examiner

*Primary Examiner*—Hezron Williams
*Assistant Examiner*—Paul M. West
(74) *Attorney, Agent, or Firm*—Martin A. Farber

(57) ABSTRACT

An ultrasonic filling level sensor (1), has an elongated measuring chamber (2), which is provided with an opening (3) at each of its two ends, wherein a liquid has the same filling level as outside the measuring chamber (2). The sensor includes an ultrasonic transceiver (6), which is associated with one end of the measuring chamber (2) and the emitted sound signals of which are reflected at the surface of the liquid and at a calibrating reflector (5) and received by the ultrasonic transceiver (6), in order to determine the filling level from the relationship between the transit times of the two signals. It is provided that the cross-section of the measuring chamber (2) and the nature of a wall of the measuring chamber are made to suit the properties of the liquid in such a way that, even in a tilted position of the measuring chamber (2), the surface of the liquid forms a meniscus (14) which forms a reflection portion directed toward the ultrasonic transceiver (6).

7 Claims, 2 Drawing Sheets

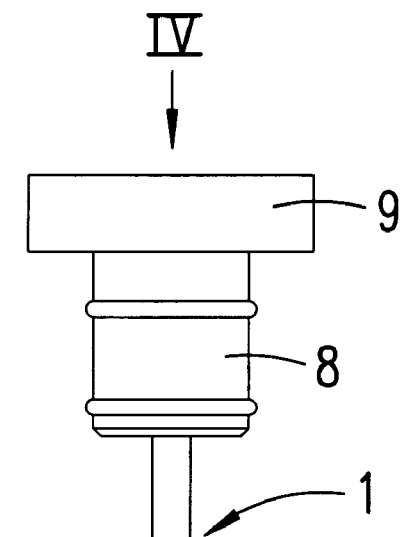
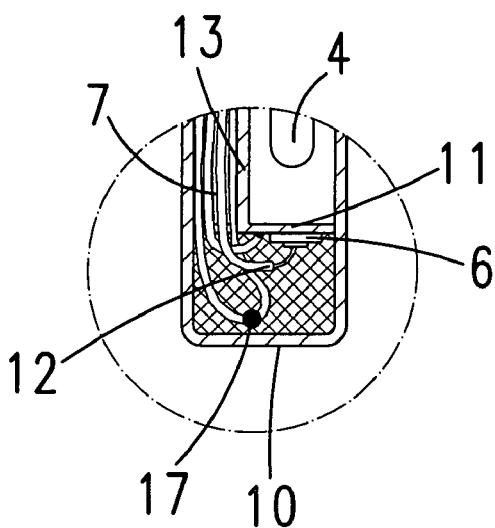
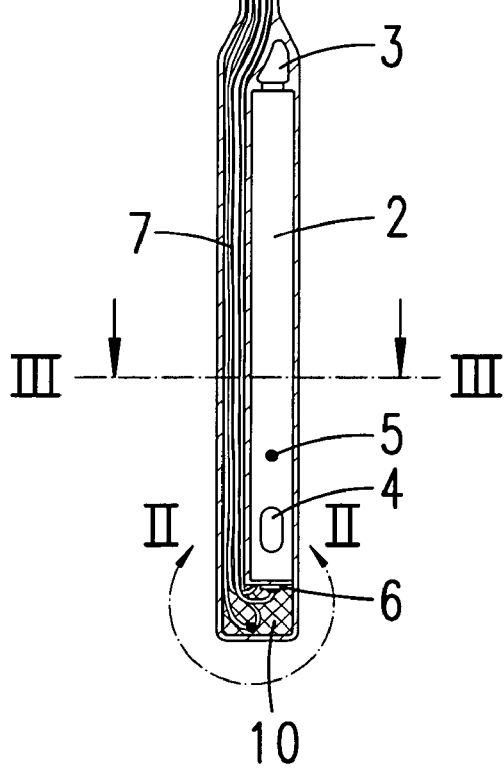
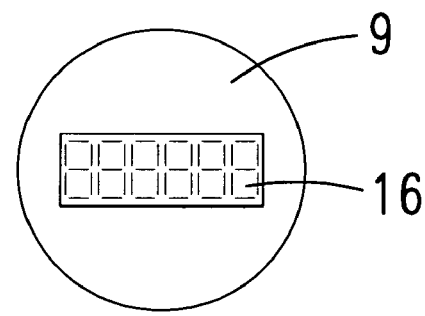
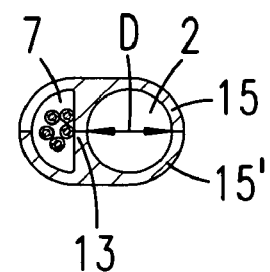

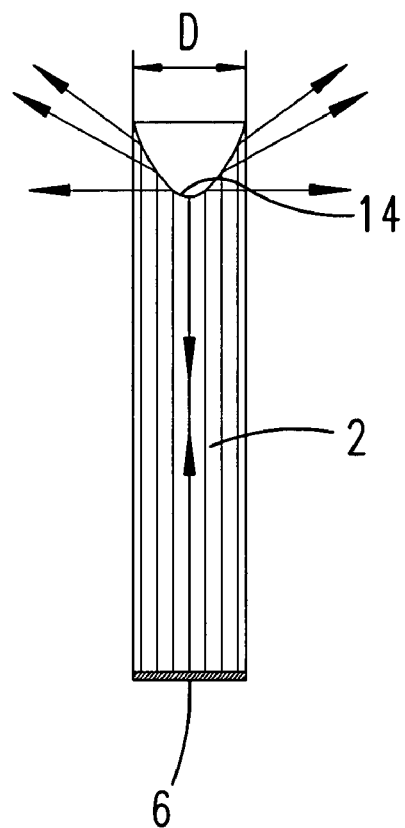
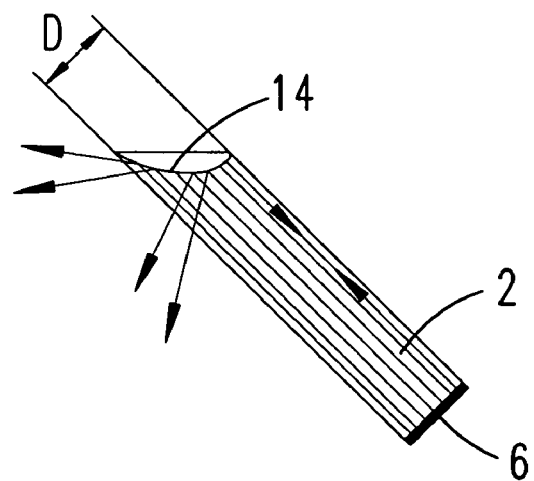

ULTRASONIC FILLING LEVEL SENSOR

FIELD AND BACKGROUND OF THE INVENTION

The invention relates to an ultrasonic filling level sensor having an elongated measuring chamber, which is provided with an opening at each of its two ends and in which a liquid has the same filling level as outside the measuring chamber, and having an ultrasonic transceiver, which is associated with one end of the measuring chamber and the emitted sound signals of which are reflected at the surface of the liquid and at a calibrating reflector and received by the ultrasonic transceiver, in order to determine the filling level from the relationship between the transit times of the two signals.

An ultrasonic filling level sensor is disclosed by DE 4328046 A1. This document describes a device forming a tube which is coated on the inside and in which a rod is to be disposed. Located at the bottom of the tube is an ultrasonic transceiver. This emits an ultrasonic signal, which travels along the direction of the extent of the tube or of the rod disposed in it, is reflected at the surface of the liquid and received by the ultrasonic transceiver. At a defined distance from the bottom, that is from the transceiver, there is a calibrating reflector. The liquid level can be determined from the relationship between the transit time of a signal reflected there and the signal reflected at the surface of the liquid. As a result of the rod disposed in the tube, the liquid sensor described there is intended to be capable of also operating in the tilted state.

DE 33 30 059 C2 describes a liquid sensor in a tank, with which an ultrasonic signal is passed through a hollow line, having an irregular form, to be reflected at the surface of a liquid.

DE 43 076 35 A1 discloses a filling level measuring device which is provided with a large number of reflectors. The height of the liquid is calculated from the relationship between the difference between the arrival times of the pulses from the two uppermost submerged reflectors and the difference between the arrival times of the pulses from the surface of the liquid and the uppermost submerged reflector.

DE 44 194 62 C2 describes a liquid sensor in the form of a dipstick. The liquid sensor can be inserted into the opening of a tank. The dipstick can thereby be inserted through the opening of a ball valve. The signal emitted by an ultrasonic sensor is reflected at a float.

DE 33 30 063 C2 discloses a liquid level gage for irregularly shaped liquid containers of vehicles. Also provided here is an evaluation device, which determines the number of not submerged reference reflectors and the number of submerged reference reflectors.

Also known from the prior art, for example DE 40 253 26 C2, are liquid sensors with which a separate measuring chamber is not used. Rather, the sound signal is emitted directly from the bottom of the container. To ensure that the sound signal is reflected at a reflection area of the surface directed toward the ultrasonic transceiver, an acoustic lens is provided there.

When elongated, in particular tubular, measuring chambers are used, the sound waves are emitted by a transceiver disposed at the bottom of the measuring chamber. They pass through the elongated measuring chamber substantially without being reflected at the walls of the measuring chamber, to be reflected at the surface of the liquid. Only the portion of the reflected sound signals that is reflected precisely in its direction reaches the transceiver. Such a filling level sensor only functions when the reflection area is directed toward the ultrasonic transceiver, that is to say extends substantially transversely to the longitudinal direction of the measuring chamber. For this reason, the known ultrasonic filling level sensors can substantially only be used in a vertical position. In the case of the aforementioned, generically determinative DE 4328046 A1, a rod is intended to make it possible for the sensor also to be used at great tilting angles with respect to the vertical. A device of this type is complex and cannot be used as a dipstick.

The invention is therefore based on the object of developing an ultrasonic filling level sensor of the generic type which is simpler in terms of production engineering and advantageous in use.

SUMMARY OF THE INVENTION

The object is achieved by the invention specified in the claims.

Claim 1 provides in the first instance and substantially that the cross-section of the measuring chamber and the nature of the wall of the measuring chamber are made to suit the properties of the liquid in such a way that, even in a tilted position of the measuring chamber, the surface of the liquid forms a meniscus which forms a reflection portion directed toward the ultrasonic transceiver. In a preferred development of the invention, it is provided that the filling level sensor forms a dipstick provided with a stopper. The stopper can be inserted in an opening of a chamber for receiving the liquid. The dipstick therefore does not have to reach as far as the bottom of the liquid-receiving chamber. It is sufficient if the dipstick extends only over the region in which the liquid level is to fluctuate. In particular, the invention relates to a dipstick for engine oil of an internal combustion engine. Accordingly, the liquid is preferably engine oil. The configuration according to the invention also makes it possible to use a bent dipstick. As a result, the dipstick according to the invention is suitable for use on motorcycle engines. The portion of the dipstick having the measuring chamber may be fixedly or flexibly connected to the stopper. Alongside the measuring chamber there may be disposed a cable duct, through which cables leading to the transceiver run. The bottom of the measuring chamber may be closed by a ceramic plate. On the side of the ceramic plate that is facing away from the measuring chamber is the ultrasonic transceiver unit. In a particularly preferred configuration, the dipstick is formed by two shells connected to each other. These shells may consist of plastic and be adhesively bonded or welded to each other. As a result, two chambers running parallel to each other are formed. One is provided with or connected to an opening both at the top and at the bottom and forms the measuring chamber. The chamber lying alongside it forms the cable duct. On the end face of the stopper there may be disposed a viewing indicator, on which, apart from the temperature of the oil, the filling level is presented, for example as a bar diagram. In addition to the leads to the transceiver, leads for a thermocouple disposed in the region of the end of the dipstick may run in the cable duct.

BRIEF DESCRIPTION OF THE DRAWINGS

An exemplary embodiment is explained below with reference to accompanying drawings, in which:

FIG. 1 shows in a partly cutaway view a dipstick for the oil sump of a motorcycle engine, FIG. 2 shows in enlarged representation the bottom of the dipstick of the detail II—II in FIG. 1, FIG. 3 shows a section along the line III—III in FIG. 1 in enlarged representation, FIG. 4 shows the plan view of the end face of the stopper, FIG. 5 shows a basic representation of the sound waves reflected at the meniscus within the measuring chamber for a vertically aligned measuring chamber and FIG. 6 shows a representation according to FIG. 5 for a tilted measuring chamber.

DETAILED DESCRIPTION OF THE PREFERRED EMBODIMENT

The filling level sensor designated by the reference numeral 1 has an elongated shape and comprises two shells 15, 15' which are welded or adhesively bonded to each other. The filling level sensor 1 has at its one end a stopper 8, which closes the oil filling opening of an oil sump of an engine. On the stopper 8 there is an evaluating-indicating device 9, the end face of which has a viewing indicator 16. The viewing indicator shows the oil level within the oil sump and additionally the oil temperature, for example in the form of a bar diagram. The filling level sensor 1 is in the form of a rod and has an elongated measuring chamber 2, which is associated with a portion of the filling level sensor 1 with a widened diameter. The measuring chamber 1 has an upper opening 3 and a lower opening 4, through which air or liquids can enter or leave. The bottom of the measuring chamber 2 is formed by a ceramic plate 11. On the rear side of the ceramic plate 11 there is an ultrasonic transceiving device 6. This is connected to supply leads 12, which run in a cable duct 7, which is alongside the measuring chamber 2.

On the rear of the ceramic plate 11 is a hollow space, filled with a casting composition 10. This ensures that the liquid does not flow out of the measuring chamber 2 in this region or into the cable duct.

As FIG. 3 reveals, the filling level sensor 1 forms two adjacent chambers 2, 7, which are separated by a dividing wall 13. Two shells 15, 15', which are adhesively bonded or welded to each other, are provided. The measuring chamber 2 may have a circular cross-section.

The diameter D of the measuring chamber 2 is adapted to the viscous properties and to the surface tension of the liquid for which the dipstick is to be used to measure its level. The surface of the wall of the measuring chamber 2 is of such a nature that the surface of the liquid within the measuring chamber 2 forms a parabolic surface shape in the form of the meniscus 14.

As FIG. 5 shows, the sound waves emitted by the ultrasonic transceiver 6, which travel in a straight line within the measuring chamber 2, are fanned out at the surface that is curved over its entire area, i.e. by the meniscus 14. It is consequently ensured that the surface has a portion which is directed toward the ultrasonic transceiver in such a way that the sound waves reflected there travel in the direction of the ultrasonic transceiver 6.

The form of the meniscus 14 changes only insignificantly when the measuring chamber 2 is tilted, as represented in FIG. 6. Even in the tilted position, the meniscus 14, which is curved over its entire area; makes the sound waves that impinge on the surface of the liquid fan out. Here, too, it is ensured that this surface forms a reflection portion which is directed toward the ultrasonic transmitter, so that the sound waves reflected there run back again to the ultrasonic transceiver 6.

In the representations according to FIGS. 5 and 6, the wall of the measuring chamber 2 and its diameter D are made to suit the liquid located in the measuring chamber 2 in such a way that the wall is wetted. However, it is also possible to configure the wall of the measuring chamber 2 in such a way that it is not wetted by the liquid. An upwardly curved meniscus then forms. Here, too, the diameter D of the measuring chamber 2 is made to match the corresponding properties of the liquid in such a way that even in the tilted state there forms a continuous curvature in the form of a quasi paraboloid, so that, even in the tilted state, a portion of the surface runs transversely in relation to the direction of the extent of the measuring chamber 2, in order to reflect the sound waves impinging there back toward the ultrasonic transceiver 6.

The ultrasonic transceiver 6 is capable both of emitting ultrasonic waves and of receiving the same. The ultrasonic transceiver obtains the transmit signal from the device which is designated by the reference numeral 9 and is disposed on the stopper 9. The signals reflected at the surface of the liquid trigger at the transceiver 6 a receive signal, which is likewise fed to the device. The transceiver 6 also emits a receive signal when it receives the ultrasonic waves that are reflected at a calibrating reflector 5 disposed at a defined distance above the bottom of the measuring chamber 2. The device 9 can calculate the filling level from the difference between the transit times of these two sound signals. The result is indicated on the display 16. The distance between the calibrating reflector 5 and the ultrasonic transceiver 6 is less than the minimum liquid level to be measured.

I claim:

1. Ultrasonic filling level sensor (1), having an elongated measuring chamber (2), which is provided with an opening (3) at each of its two ends and in which a liquid has the same filling level as outside the measuring chamber (2) and the emitted sound signals of which transceiver are reflected at the surface of the liquid and at a calibrating reflector (5) and received by the ultrasonic Transceiver (6), in order to determine the filling level from a relationship between the transit times of the two signals, wherein the cross-section of the measuring chamber (2) and the nature of a wall of the measuring chamber are made to suit the properties of the liquid in such a way that, a radius of the chamber is commensurate with a curved portion of a meniscue of the liquid to provide for a continuous curvature of meniscus across a diameter of the chamber, so that even in a tilted position of the measuring chamber (2), a surface of the liquid forms a meniscus (14) which forms a reflection portion directed toward the ultrasonic transceiver (6).

2. Ultrasonic filling level sensor according to claim 1, wherein the filling level sensor (6) forms a dipstick provided with a stopper (8).

3. Ultrasonic filling level sensor according to claim 1, wherein the liquid is engine oil.

4. Ultrasonic filling level sensor according to claim 1, wherein a cable duct (7) is located alongside the measuring chamber (2).

5. Ultrasonic filling level sensor according to claim 1, wherein the measuring chamber (2) is closed at its one end by a ceramic plate (11) carrying the ultrasonic transceiver (6).

6. Ultrasonic filling level sensor according to claim 1, wherein the sensor is configured as a dipstick that is formed by two shells (15) connected to each other.

7. Ultrasonic filling level sensor according to claim 6, further comprising a viewing indicator (16) associated with the end face of a stopper (8) of the dipstick.

* * * * *